3,002,007
OXYGENATED DERIVATIVES OF
4-METHYLESTRANES
Willard M. Hoehn, Wilmette, Ill., assignor to G. D. Searle & Co., Chicago, Ill., a corporation of Delaware
No Drawing. Filed Aug. 20, 1959, Ser. No. 834,933
9 Claims. (Cl. 260—397.3)

The present invention is concerned with oxygen-containing 4-methyl steriods and, more particularly, with oxygenated 4-methylestranes of the structural formula

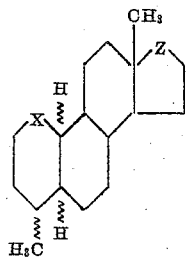

wherein X is selected from the group consisting of methylene, carbonyl, hydroxymethylene, and (lower alkanoyl) oxymethylene radicals; Z is selected from the group consisting of carbonyl, hydroxymethylene, and (lower alkanoyl)oxymethylene radicals, and the configuration at carbons 1, 4, 5, 10, and 17 can be alternatively "α" or "β." The term "lower alkanoyl" represents, for example, formyl, acetyl, propionyl, butyryl, valeryl, caproyl, and the branched-chain isomers thereof; said groups being the acyl radicals of alkanoic acids containing fewer than 7 carbon atoms.

The compounds of this invention can be manufactured by treating a suitable starting material such as 1-hydroxy-4-methylestra-1,3,5(10)-trien-17-one with hydrogen in the presence of an appropriate hydrogenation catalyst. The instant 4-methylestranes are obtained by the use of one of several hydrogenation catalysts. Depending upon the particular catalyst employed, both the nature of the substituents at carbons 1 and 17 and the stereochemical configuration at carbons 1, 4, 5, 10, and 17 will vary. It is known that a hydrogenation catalyst combines with both the hydrogen acceptor and with hydrogen, and that each is activated and held in such a spatial relationship with respect to each other so that reaction occurs. It is apparent, therefore, that the spatial relationship of the catalyst-acceptor attachment is dependent upon the precise nature of the catalyst.

In order to obtain the instant 17-mono-oxygenated 4-methylestranes, 1-hydroxy-4-methylestra-1,3,5(10)-trien-17-one is treated with hydrogen in the presence of platinum oxide catalyst and acetic acid. Both 4-methylestran-17-ol and 17-acetoxy-4-methylestrane are obtained by this process. Oxidation of the former alcohol, suitably with chromic acid, yields 4-methylestran-17-one; while acylation with a lower alkanoic acid anhydride affords the corresponding 17-(lower alkanoate).

The various stereoisomeric 4-methylestrane-1,17-diols can be prepared by catalytic hydrogenation of 1-hydroxy-4-methylestra-1,3,5(10)-trien-17-one in the presence of one of several hydrogenation catalysts. 4β-methyl-5α,10α-estrane-1β,17β-diol is obtained, for example, by hydrogenation of the aforementioned substrate in the presence of a platinum oxide or rhodium-alumina catalyst. On the other hand, 4α-methyl-5β-estrane-1α,17β-diol can be manufactured by hydrogenation of the aforementioned estratriene by use of a platinum oxide, ruthenium dioxide, or rhodium-alumina catalyst. 4β-methyl-5β-estrane-1α,17β-diol is preferably produced by hydrogenation in the presence of ruthenium oxide. Hydrogenation of 1-hydroxy - 4 - methylestra - 1,3,5(10) - trien - 17 - one with a rhodium-alumina catalyst yields 4α-methyl-5α-estrane-1α,17β-diol.

The instant 17-hydroxy-1-ketones are obtained by one of the processes described supra. For example, 17α-hydroxy-4β-methyl-5α,10α-estran-1-one is obtainted in the instance where a rhodium-alumina catalyst is used; but in the presence of ruthenium oxide, 17β-hydroxy-4β-methyl-5α,10α-estran-1-one is produced.

The 1,17-diones of this invention are suitably manufactured by oxidation, preferably with chromic acid, of either the corresponding 1,17-diols or the 17-hydroxy-1-ones. As a specific example, treating 4-methyl-5β-estrane-1α,17β-diol with chromic acid results in 4-methyl-5β-estrane-1,17-dione. Acylation of the aforementioned 1,17-diols or 17-hydroxy-1-ones with a lower alkanoic acid anhydride in pyridine affords the corresponding lower alkanoates.

Treatment of a 5α,10α-estrane of this invention with an inorganic base such as potassium hydroxide results in an inversion of the configuration at carbon 10 and, thus, conversion to a 5α-estrane. For instance, 4β-methyl-5α,10α-estrane-1,17-dione is isomerized with potassium hydroxide in ethanol to yield 4β-methyl-5α-estrane-1,17-dione.

The compounds of this invention are useful as a result of their valuable pharmacological properties. They have, for example, progestational activity as evidenced by their ability to promote proliferation of the endometrial gland.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

*Example 1*

A mixture of 10 parts of 1-hydroxy-4-methylestra-1,3,5(10)-trien-17-one, 60 parts of acetic acid, 30 parts of ethyl acetate, and one part of platinum oxide catalyst is shaken in a hydrogen atmosphere at about 900 p.s.i. pressure and at a temperature of 55–75° until the absorption of hydrogen ceases. The catalyst is removed by filtration and the filtrate evaporated to dryness in vacuo. The residue is adsorbed on sicila gel and the chromatographic column washed with benzene. Elution of the column with 5% ethyl acetate in benzene followed by recrystallization from aqueous methanol affords pure 17β-acetoxy-4β-methyl-5α,10α-estrane, M.P. 65–68°; $[\alpha]_D = -5.9°$ (chloroform).

The column is further eluted with 5% ethyl acetate in benzene to yield, after recrystallization from cyclohexane, 4β - methyl - 5α,10α - estran - 17β - ol, M.P. 112–114°; $[\alpha]_D = +7.5°$.

By elution of the column with 10% ethyl acetate in benzene followed by recrystallization from ether, 4β-methyl-5α,10α-estrane-1β,17β-diol, M.P. 183–185°, $[\alpha]_D = -38.2°$; is obtained.

The column is finally eluted with 15% ethyl acetate in benzene and the residue from concentration of the eluate triturated with ether to afford 4α-methyl-5β-estrane-1α,17β-diol, M.P. 206–208°; $[\alpha]_D = +57°$ (chloroform).

*Example 2*

A mixture of 30 parts of 1-hydroxy-4-methylestra-1,3,5(10)-trien-17-one, 65 parts of acetic acid, 32 parts of ethyl acetate, and 3 parts of a 5% rhodium-on-alumina catalyst is shaken at about 1100 p.s.i. pressure and at a temperature of 60–70° until no further absorption of hydrogen occurs. The catalyst is removed by filtration and the filtrate evaporated to dryness in vacuo. The residue is dissolved in benzene and adsorbed on a silica gel chromatographic column. The column is washed first with benzene then with 5% ethyl acetate in benzene, and the washings discarded. The column is eluted further with 5% ethyl acetate in benzene then with 10% ethyl acetate in benzene, and the eluants combined and evaporated to dryness in vacuo. Recrystallization of the residue from aqueous methanol affords pure 17α-hydroxy-4β-methyl-5α,10α-estran-1-one, M.P. 145–146°; $[\alpha]_D = -10.5°$ (chloroform).

The chromatographic column is eluted again with 10% ethyl acetate in benzene and the eluant concentrated to dryness in vacuo, resulting in a residue which is triturated with ether to afford 4β-methyl-5α,10α-estrane-1β,17β-diol. The substance is identical with the material described in Example 1.

Further elution of the column with 15% ethyl acetate in benzene followed by trituration with ether yields pure 4α-methyl-5β-estrane-1α,17β-diol which is identical with the material described in Example 1.

The column is finally eluted with 20% ethyl acetate in benzene, the eluant concentrated to dryness in vacuo and the residue triturated with ether to afford pure 4α-methyl-5α-estrane-1α,17β-diol, M.P. 165–166°; $[\alpha]_D = +31.9°$.

*Example 3*

A mixture of 3 parts of 1-hydroxy-4-methylestra-1,3,5(10)-trien-17-one, 40 parts of ethanol and 0.5 part of ruthenium dioxide is shaken in a hydrogen atmosphere at about 1250 p.s.i. pressure and at a temperature of 60–65° until no further drop in pressure is noted. The catalyst is removed by filtration, the filtrate concentrated to dryness in vacuo, and the residue adsorbed on silica gel. The chromatographic column is washed successively with benzene and 2% ethyl acetate in benzene, and the washings discarded.

Elution of the column with 5% ethyl acetate in benzene followed by recrystallization from ethyl acetate-pentane affords pure 17β-hydroxy-4β-methyl-5α,10α-estran-1-one, M.P. 130–132°; $[\alpha]_D = -17.9°$.

The column is further eluted with 10% ethyl acetate in benzene, and the material obtained from the eluate is recrystallized from aqueous acetone to yield pure 4β-methyl-5β-estrane-1α,17β-diol, M.P. 189–190°; $[\alpha]_D = +27°$.

Further elution of the column with 10% ethyl acetate in benzene followed by trituration with ether affords pure 4α-methyl-5β-estrane-1α,17β-diol, which is identical with the compound described in Example 2.

*Example 4*

To a solution of 1.7 parts of 17β-hydroxy-4β-methyl-5α,10α-estran-1-one in 32 parts of acetone is added, at room temperature, 1.8 parts by volume of 8 N aqueous chromic acid. The supernatant liquid is decanted from the precipitate which forms and is diluted with water. The resulting solid is collected by filtration and crystallized from aqueous methanol to afford pure 4β-methyl-5α,10α-estrane-1,17-dione, M.P. 122–124°; $[\alpha]_D = +54°$.

The identical diketone is obtained by substituting an equivalent quantity of 4β-methyl-5α,10α-estrane-1β,17β-diol in the herein-described process.

*Example 5*

To a solution of 6.5 parts of 4α-methyl-5β-estrane-1α,17β-diol in 320 parts of acetone is added dropwise, at room temperature, 12 parts by volume of 8 N aqueous chromic acid. The acetone solution is decanted from the precipitated solid and diluted with water. The resulting mixture is distilled to remove most of the acetone, and the crystalline product collected by filtration, washed with water, and dried to afford pure 4α-methyl-5β-estrane-1,17-dione, M.P. 128–130°; $[\alpha]_D = +27.5°$.

*Example 6*

To a solution of 3.5 parts of 4α-methyl-5α-estrane-1α,17β-diol in 80 parts of acetone is added dropwise, at room temperature, 6.5 parts by volume of 8 N aqueous chromic acid. The supernatant liquid is separated from the precipitated sludge by decantation, and is diulted with water. The solid which forms is collected by filtration and crystallized from aqueous methanol to afford pure 4α-methyl-5α-estrane-1,17-dione, M.P. 134–136°; $[\alpha]_D = +185.7°$ (chloroform).

*Example 7*

A mixture of 5 parts of 4β-methyl-5α-estrane-1,17-dione, 400 parts of ethanol, and 40 parts of potassium hydroxide is heated to reflux, then concentrated to a small volume and cooled. The resulting solid is collected by filtration and crystallized from acetone to produce 4β-methyl-5α-estrane-1,17-dione, M.P. 110–112° $[\alpha]_D = +80.2°$ (chloroform).

*Example 8*

The oxidation of 4β-methyl-5β-estrane-1α,17β-diol by the procedure described in Example 4, followed by recrystallization from aqueous acetone results in pure 4β-methyl-5β-estrane-1,17-dione, M.P. 110–112°; $[\alpha]_D = +19.5°$ (chloroform).

*Example 9*

A mixture of 3 parts of 4β-methyl-5α-estrane-1α,17β-diol, 5 parts of acetic anhydride, and 5 parts of pyridine is heated at about 60° for about one hour. The reaction mixture is cooled and diluted with water, and the resultant crude product collected by filtration. It can be recrystallized from pentane to afford pure 17β-acetoxy-4β-methyl-5α-estran-1α-ol, M.P. 141–143°; $[\alpha]_D = +24°$.

By substituting an equivalent quantity of propionic anhydride and otherwise proceeding according to the herein described processes, 17β-propionoxy-4β-methyl-5α-estran-1α-ol is obtained.

*Example 10*

A mixture of 3 parts of 4β-methyl-5α-estrane-1α,17β-diol, 20 parts of acetic anhydride, and 20 parts of pyridine is heated at about 60° for about one hour, then diluted with water. The resulting solid is collected by filtration and recrystallized from acetone-pentane to afford pure 1α,17β-diacetoxy-4β-methyl-5α-estrane, M.P. 158–159°; $[\alpha]_D = +40.5°$.

Substitution of an equivalent quantity of propionic anhydride in the instant process results in 4β-methyl-1α,17β-dipropionoxy-5α-estrane.

What is claimed is:
1. 4β-methyl-5α-10α-estrane-1β,17β-diol.
2. 17α-hydroxy-4β-methyl-5α-10α-estran-1-one.
3. 4α-methyl-5β-estrane-1α,17β-diol.
4. 4α-methyl-5β-estrane-1,17-dione.
5. 4β-methyl-5α,10α-estrane-1,17-dione.

6. A compound of the structural formula

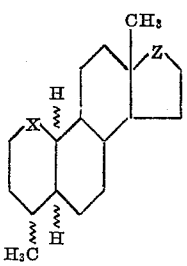

wherein X is selected from the group consisting of carbonyl, α-hydroxymethylene, and α-(lower alkanoyl)oxy methylene radicals, and Z is selected from the group consisting of carbonyl, β-hydroxymethylene, and β-(lower alkanoyl)oxy methylene radicals.

7. A compound of the structural formula

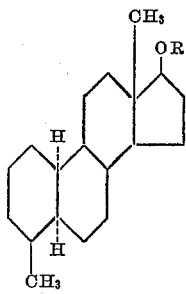

wherein R is a lower alkanoyl radical.

8. 17β-acetoxy-4β-methyl-5α,10α-estrane.
9. 4β-methyl-5α,10α-estran-17β-ol.

No references cited.